US011021559B2

(12) United States Patent
Tan et al.

(10) Patent No.: US 11,021,559 B2
(45) Date of Patent: Jun. 1, 2021

(54) SULFONATED BLOCK COPOLYMER LAMINATES WITH POLAR OR ACTIVE METAL SUBSTRATES

(71) Applicant: Kraton Polymers LLC, Houston, TX (US)

(72) Inventors: Kuitian Tan, Houston, TX (US); Carl L Willis, Houston, TX (US); Steven Huynh, Houston, TX (US)

(73) Assignee: Kraton Polymers LLC, Houston, TX (US)

( * ) Notice: Subject to any disclaimer, the term of this patent is extended or adjusted under 35 U.S.C. 154(b) by 0 days.

(21) Appl. No.: 16/678,198

(22) Filed: Nov. 8, 2019

(65) Prior Publication Data

US 2020/0071447 A1 Mar. 5, 2020

Related U.S. Application Data

(63) Continuation-in-part of application No. 13/285,306, filed on Oct. 31, 2011, now abandoned.

(51) Int. Cl.
*C08F 297/04* (2006.01)
*C08F 8/36* (2006.01)
(Continued)

(52) U.S. Cl.
CPC .......... *C08F 297/046* (2013.01); *B32B 15/06* (2013.01); *B32B 15/20* (2013.01);
(Continued)

(58) Field of Classification Search
CPC ... B32B 38/164; B32B 15/08; B32B 37/0038; B32B 2311/00; B32B 2038/166;
(Continued)

(56) References Cited

U.S. PATENT DOCUMENTS 3,135,716 A 6/1964 Uraneek et al.
3,150,209 A 9/1964 Short et al.
(Continued)

FOREIGN PATENT DOCUMENTS

CA 116645 A 8/1965
CN 101281293 A 10/2008
(Continued)

OTHER PUBLICATIONS

"Metallized Plastics 2: Fundamental and Applied Aspects: vol. 2" editted by KL Mittal (p. 405-406); New York 1991.*
(Continued)

*Primary Examiner* — Kevin R Kruer

(57) ABSTRACT

Disclosed herein is a process for laminating a polar substrate with a film cast from a sulfonated block copolymer having at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units. The film is exposed to water and dried onto a polar or active metal substrate. The laminates do not delaminate in the presence of water, or in a humidity of up to 85%, and at a temperature of at least 60° C. The laminates are used for a variety of applications including energy exchange applications.

16 Claims, 8 Drawing Sheets

(51) Int. Cl.
  *C09J 5/02* (2006.01)
  *C08F 8/04* (2006.01)
  *C09D 153/02* (2006.01)
  *C08J 5/12* (2006.01)
  *C09K 5/14* (2006.01)
  *B32B 15/20* (2006.01)
  *B32B 15/06* (2006.01)

(52) U.S. Cl.
  CPC .................. *C08F 8/04* (2013.01); *C08F 8/36* (2013.01); *C08J 5/12* (2013.01); *C09D 153/025* (2013.01); *C09J 5/02* (2013.01); *C09K 5/14* (2013.01); *C08F 2810/50* (2013.01); *C08J 2353/02* (2013.01); *C09J 2400/163* (2013.01); *C09J 2453/006* (2013.01); *C09J 2453/008* (2013.01)

(58) Field of Classification Search
  CPC ............ F28D 19/042; F24F 2203/1032; Y10T 428/31692
  See application file for complete search history.

(56) References Cited

U.S. PATENT DOCUMENTS

| | | |
|---|---|---|
| 3,450,795 A | 6/1969 | Langer |
| 3,577,357 A | 4/1971 | Winkler |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 3,985,830 A | 10/1976 | Fetters et al. |
| 4,039,593 A | 8/1977 | Kamienski et al. |
| 4,107,131 A | 8/1978 | Gergen et al. |
| 4,107,236 A | 8/1978 | Naylor et al. |
| 4,241,129 A | 12/1980 | Marton et al. |
| 4,391,949 A | 5/1983 | St. Clair |
| 4,409,357 A | 10/1983 | Milkovich |
| 4,444,953 A | 4/1984 | St. Clair |
| 4,578,429 A | 3/1986 | Gergen et al. |
| 4,769,053 A | 8/1988 | Fischer |
| 4,946,899 A | 1/1990 | Kennedy et al. |
| 4,970,265 A | 11/1990 | Willis |
| 5,239,010 A | 5/1993 | Balas et al. |
| 5,468,574 A | 11/1995 | Ehrenberg et al. |
| 5,480,387 A | 1/1996 | Gabriel et al. |
| 5,496,397 A | 3/1996 | Fischer et al. |
| 5,516,831 A | 5/1996 | Pottick et al. |
| 5,771,707 A | 6/1998 | Legace et al. |
| 5,827,602 A | 10/1998 | Koch et al. |
| 5,840,387 A | 11/1998 | Berlowitz-Tarrant et al. |
| 5,925,621 A | 7/1999 | Zaneveld et al. |
| 6,028,115 A | 2/2000 | Zaneveld et al. |
| 6,239,182 B1 | 5/2001 | Zaneveld et al. |
| 6,444,767 B1 | 9/2002 | Schade et al. |
| 6,455,651 B1 | 9/2002 | Willis et al. |
| 6,391,981 B1 | 11/2002 | Willis et al. |
| 6,492,469 B2 | 12/2002 | Willis |
| 6,537,538 B2 | 3/2003 | Zaneveld et al. |
| 6,515,083 B2 | 4/2003 | Ozawa et al. |
| 6,531,241 B1 | 11/2003 | McEwen |
| 6,686,423 B1 | 2/2004 | Desbois et al. |
| 6,699,941 B1 | 3/2004 | Handlin et al. |
| 6,767,976 B2 | 7/2004 | Hamada et al. |
| 6,932,619 B2 | 8/2005 | Chen |
| 7,169,848 B2 | 1/2007 | Bening et al. |
| 7,737,224 B2 | 6/2010 | Willis et al. |
| 2007/0021569 A1 | 1/2007 | Willis et al. |
| 2009/0280382 A1 | 11/2009 | Mackinnon |
| 2010/0223716 A1 | 9/2010 | Howard, Jr. |
| 2011/0086982 A1 | 4/2011 | Willis |

FOREIGN PATENT DOCUMENTS

| | | |
|---|---|---|
| EP | 1113517 A2 | 7/2007 |
| JP | 2004535270 A | 11/2004 |
| JP | 2007056147 A | 3/2007 |
| TW | 200745190 A | 12/2007 |
| WO | 2008089332 A3 | 7/2008 |
| WO | 2009137678 A1 | 12/2009 |

OTHER PUBLICATIONS

Coates, G.W., Hustad, P.D., Reinartz, S., Catalysts for the Living Insertion Polymerization of Alken es: Access to New Polyolefin Architectures Using Ziegler-Natta Chemistry. Angew. Chem. Intd. Ed. 2002, 41, 2236-2257.

Hawker, C.J., Bosman, A.W. and Harth, E., New Polymer Synthesis. by Nitroxide Mediated Living Radie.al Polymerizations. Chem. Rev. 2002, 101, 3661-3688.

Yeung, A.S. and Frank, C.W., Block copolymer micelle solutions: 2. An intrinsic excimer fluorescence study. Polymer, 31, pp. 2089-2100 and 2101-2111 (1990).

Yeung, A.S. and Frank, C.W., Block copolymer micelle solutions: 1. Concentration dependence of polystyrene-poly( ethylene propylene) in heptane. Polymer, 31, pp. 2089-2100 (1990).

\* cited by examiner

SULFONATED BLOCK COPOLYMER LAMINATES WITH POLAR OR ACTIVE METAL SUBSTRATES

This Application is a Continuation-In-Part of pending Non-provisional application Ser. No. 13/285,306, filed on Oct. 31, 2011.

FIELD OF THE DISCLOSURE

The present disclosure relates to the use of polymeric films for laminating polar substrates and/or active metal substrates. In particular the present disclosure relates to films cast from a sulfonated block copolymer having at least two polymer end blocks that contain little or no sulfonic acid or sulfonate functionality and at least one polymer interior block which contains an effective amount of sulfonic acid or sulfonate functionality which may be exposed to water and laminated to the polar surface or active metal surface of a substrate. Optionally, the laminated films may be moisture-vapor permeable and may serve to benefit a variety of applications including air to air energy exchange for heating, ventilation and air conditioning systems.

BACKGROUND OF THE DISCLOSURE

Styrenic block copolymers are well known in the art. Generally, styrenic block copolymers ("SBC") can comprise internal polymer blocks and terminal end polymer blocks comprising chemically different monomer types thereby providing particular desirable properties. As an example, in a more common form, SBCs may have internal blocks of conjugated diene and external blocks having aromatic alkenyl arenes. The interaction of the differing properties of the polymer blocks allows for different polymer characteristics to be obtained. For example, the elastomer properties of internal conjugated diene blocks along with the "harder" aromatic alkenyl arenes external blocks together form polymers which are useful for an enormous variety of applications. Such SBCs can be prepared through sequential polymerization and/or through coupling reactions.

It is known also that SBC can be functionalized in order to further modify their characteristics. For example, SBC can be modified by introducing functional groups such as carboxylic acids, esters or amides, phosphonate groups or sulfonate groups to the backbone of the polymer. Methods for incorporating functional groups into polymers containing unsaturation are taught, for example, in U.S. Pat. Nos. 3,135,716, 3,150,209, and 4,409,357. Alternative procedures in which functional groups are incorporated into hydrogenated SBC are taught, for example, in U.S. Pat. Nos. 4,578,429, and 4,970,265.

One of the first SBC functionalized by addition of sulfonic acid or sulfonate ester functional groups to the polymer backbone is disclosed, for example, in U.S. Pat. No. 3,577,357 to Winkler. The resulting block copolymer was characterized as having the general configuration $A-B-(B-A)_{1-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymers could be used as such, or could be used in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The sulfonated block copolymers were described as having water absorption characteristics that might be useful in water purification membranes and the like, but were later found not to be readily cast into films (U.S. Pat. No. 5,468,574).

More recently, U.S. Pat. No. 7,737,224 to Willis et al., disclosed the preparation of sulfonated block copolymers and illustrated a sulfonated block copolymer that is solid in water comprising at least two polymer end blocks and at least one saturated polymer interior block wherein each end block is a polymer block resistant to sulfonation and at least one interior block is a saturated polymer block susceptible to sulfonation, and wherein at least one interior block is sulfonated to the extent of 10 to 100 mol percent of the sulfonation susceptible monomer in the block. The sulfonated block copolymers are described as being able to transport high amounts of moisture-vapor while at the same time having good dimensional stability and strength in the presence of water, and as being valuable materials for end use applications which call for a combination of good wet strength, good water and proton transport characteristics, good methanol resistance, easy film or membrane formation, barrier properties, control of flexibility and elasticity, adjustable hardness, and thermal/oxidative stability.

Additionally, WO 2008/089332 to Dado et al., discloses a process for preparing sulfonated block copolymers illustrating, e.g., the sulfonation of a precursor block polymer having at least one end block A and at least one interior block B wherein each A block is a polymer block resistant to sulfonation and each B block is a polymer block susceptible to sulfonation wherein said A and B blocks are substantially free of olefinic unsaturation. The precursor block polymer was reacted with an acyl sulfate in a reaction mixture further comprising at least one non-halogenated aliphatic solvent. According to Dado et al., the process resulted in a reaction product which comprised micelles of sulfonated polymer and/or other polymer aggregates of definable size and distribution.

U.S. Pat. No. 7,737,224 to Willis et al. in its disclosure of sulfonated block copolymers indicated that, among many useful applications, they may be used for laminates. Further, pending U.S. application Ser. No. 12/893,163 discloses the use of laminate membranes for use in the core of energy recovery systems (ERV) for the exchange of heat and moisture between cross flowing air streams. The laminate membranes are disclosed as being made up of a fibrous microporous support substrate and a sulfonated block copolymer having at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units, where the sulfonated block copolymer is laminated onto the fibrous microporous support substrate.

Additionally, U.S. application Ser. No. 12/893,145 discloses a film comprising a combination of at least one elastomeric styrenic block copolymer which is optionally functionalized with functional groups different from sulfonic acid or sulfonate ester functional groups, and at least one sulfonated block copolymer. Such films may be coated onto natural and synthetic woven and non-woven materials as well as substrates made of one or more of such materials. The shape and form of the substrates include fibers, films, textiles, metallic materials, leather and wood parts or constructs. Methods for manufacture of coated articles include direct coating, spray coating, electro coating, powder coating, transfer coating and lamination processes.

However, as identified by the inventors herein, there is a need also for laminating or coating the surface of polar or metal substrates with polymeric films which avoid delamination in wet systems. In one application, energy exchange systems may employ aluminum as a support substrate with desiccants coated thereon. For example, U.S. Pat. No. 4,769,053 discloses a rotary air to air energy exchange apparatus. In this system aluminum is used as a heat exchange material in a gas permeable matrix. A coated layer made up of a molecular sieve is applied for absorbing and releasing sensible and latent heat.

As identified by the inventors, there is a need to strongly bond sulfonated block copolymer films to a polar or metal substrate which would have use in a wide variety of applications.

SUMMARY OF THE INVENTION

In one embodiment of the disclosure, a permanent laminate is provided, formed by a process comprising: (i) providing a film consisting essentially of a sulfonated block copolymer having at least one end block A and at least one interior block B; (ii) exposing the film to water to obtain a partially or fully hydrated film, (iii) applying said partially or fully hydrated film directly to a polar surface or metal activated surface of a substrate, and (iv) laminating said partially or fully hydrated film onto the polar surface or activated metal surface of the substrate by drying to form the permanent laminate. In the block copolymer, each A block contains essentially no sulfonic acid or sulfonate ester functional groups, and each B block is a polymer block containing from about 10 to about 100 mol percent sulfonic acid or sulfonate ester functional groups based on the number of monomer units. The sulfonated block copolymer has a general configuration A-B-A, A-B-A-B-A, (A-B-A)nX, (A-B)nX, A-D-B-D-A, A-B-D-B-A, (A-D-B)nX, (A-B-D)nX or mixtures thereof; where n is an integer from 2 to about 30, X is a coupling agent residue, and the plurality of A blocks, B blocks, or D blocks are the same or different. Each block D is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) a polymerized isobutylene and (v) mixtures thereof, wherein any segments containing polymerized 1,3-butadiene or isoprene are subsequently hydrogenated. In the permanent laminate thus obtained, the film does not delaminate from the substrate after being exposed to humidity of up to 85%, at a temperature of at least 60° C., for a duration of at least 72 hours.

In another embodiment of the disclosure, a permanent laminate is provided, formed by a process comprising: (i) providing a film consisting essentially of a sulfonated pentablock copolymer of formula poly(para-tert-butylstyrene-isoprene-styrene-isoprene-para-tert-butylstyrene), (ii) exposing the film to water to obtain a partially or fully hydrated film, (iii) applying said partially or fully hydrated film directly to a polar surface or metal activated surface of a substrate, and (iv) laminating said partially or fully hydrated film onto the polar surface or activated metal surface of the substrate by drying to form the permanent laminate. In the pentablock copolymer, the poly(para-tert-butylstyrene) block contains essentially no sulfonic acid or sulfonate ester functional groups, and the polystyrene block contains from 10 to 100 mol percent sulfonic acid or sulfonate ester functional groups based on the number of monomer units.

In one embodiment, the present disclosure generally provides for a process of laminating a substrate comprising providing a film comprising a sulfonated block copolymer, exposing the film to water, and laminating the film by drying the film onto the polar surface or active metal surface of a substrate.

In another embodiment, the sulfonated block copolymer has at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units.

In another embodiment the film does not delaminate when exposed to the presence of water for 30 hours. In another embodiment the laminated film maintains bonding to the substrate in the presence of water.

In another embodiment the laminated film is wrinkle free.

In another embodiment the substrate surface comprises an active metal.

In another embodiment the substrate surface comprises an active metal selected from the group consisting of Li, K, Ba, Ca, Na, Mg, Al, Zn, Cr, Fe, Cd, Co, Ni, Sn, and Pb or an alloy thereof.

In another embodiment the substrate surface comprises a metal of rows 2-4 of groups 2 through 13 of the periodic table of the elements, or an alloy of 2 or more of the metals.

In another embodiment the substrate surface comprises Aluminum.

In another embodiment the substrate surface comprises glass, leather, or a polar polymer.

In another embodiment the substrate surface is solid or porous.

In another embodiment the polar polymer comprises acrylates, methacrylates, polymethylmethacrylate (PMMA), polyacrylonitriles, polyacrylamides, polyethers, polyesters, polyethylene terephthalate (PET), polyvinyl acetate (PVA), polyvinyl chloride (PVC), polyaminespolyamides, nylon, styrene acrylonitrile polymer (SAN), epoxides, acrylonitrile—butadiene—styrene (ABS), polycarbonates or mixtures thereof.

In another embodiment the film is 25% hydrated.

In another embodiment the sulfonated block copolymer has a general configuration A-B-A, A-B-A-B-A, (A-B-A)nX, (A-B)nX, A-D-B-D-A, A-B-D-B-A, (A-D-B)nX, (A-B-D)nX or mixtures thereof, where n is an integer from 2 to about 30, and X is a coupling agent residue and wherein each D block is a polymer block resistant to sulfonation and the plurality of A blocks, B blocks, or D blocks are the same or different.

In another embodiment each D block of the sulfonated block copolymer is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

In another embodiment a laminate is formed by the aforementioned process. In another embodiment, the laminate is used in a rotary wheel heat exchanger.

In another embodiment, there is generally disclosed herein a laminate comprising a substrate comprising an active metal or polar surface, a film bonded to the surface of said substrate to form a laminate, and wherein the film comprises a sulfonated polymer.

In a further embodiment, the sulfonated polymer is block copolymer has at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units.

In a further embodiment, the film does not delaminate when exposed to the presence of water for 30 hours.

DETAILED DESCRIPTION OF THE DRAWINGS

DETAILED DESCRIPTION OF THE EMBODIMENT

Figure 1:
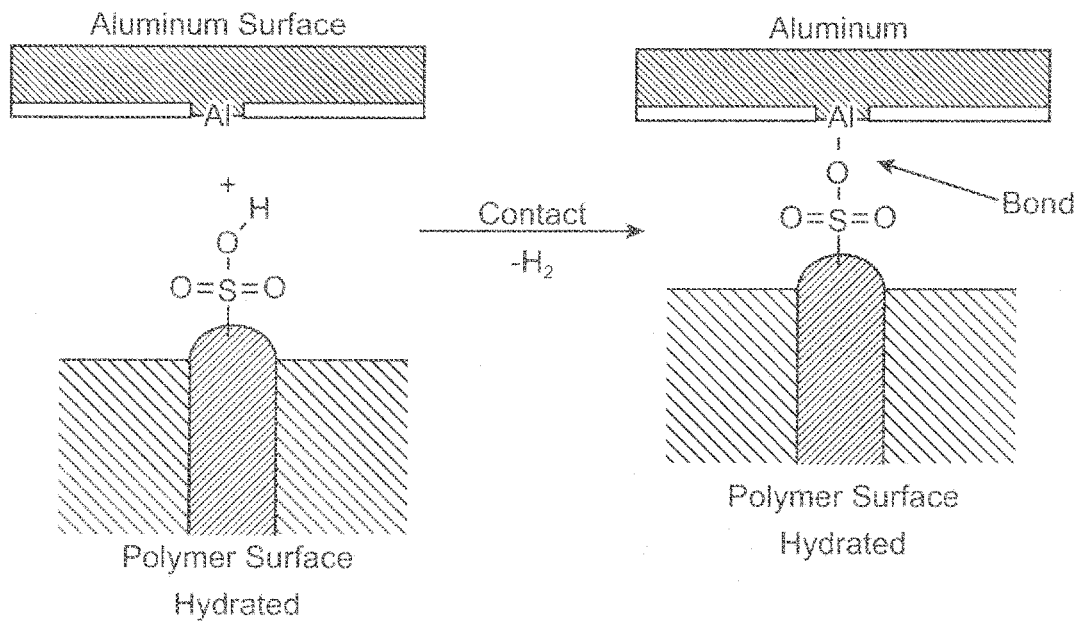
FIG. 1 is a schematic illustration of the interaction of sulfonated block copolymer membrane with an aluminum substrate.

A detailed description of embodiments for a laminated substrate and process for laminating a substrate is disclosed herein. However, it is to be understood that the disclosed embodiments are merely exemplary of the laminate and process for lamination, and therefore these may be embodied in various and alternative forms of the disclosed embodiments. Therefore, specific procedural, structural and functional details which are addressed in the embodiments disclosed herein are not to be interpreted as limiting, but merely as a basis for the claims and as a representative basis for teaching one skilled in the art to variously employ the present process.

Moreover, unless specifically stated otherwise, the following expressions as used herein are understood to have the following meanings.

The expression "equilibrium" as used herein in the context of water or other solvent absorption refers to the state in which the rate of water absorption by a block copolymer is in balance with the rate of water loss by the block copolymer. The state of equilibrium can generally be reached by immersing a sulfonated block copolymer of the present invention in water for a 24 hour period (one day). Equilibrium may also be reached in shorter time periods. The equilibrium state may be reached also in other wet environments other than full immersion, however the period of time to reach equilibrium may differ.

The expression "hydrated" refers to the absorption of water by a cast film in contact with water at room temperature and pressure. A film can be partially or fully hydrated.

The expression "fully hydrated" refers to the state wherein the maximum amount of water is absorbed by immersing a cast film in water at room temperature and pressure. A film will become fully hydrated when equilibrium is obtained while immersed in water.

The expression "partially hydrated" refers to a condition where a cast film that has absorbed less than the maximum amount of water that can be absorbed when the film is immersed in water at room temperature and pressure.

The expression "water uptake value" as used herein refers to the weight of water which is absorbed by a block copolymer in equilibrium with liquid water with condensed water as compared to the original weight of the dry material, and is calculated as a percentage. A lower water uptake value indicates that less water has been absorbed and therefore corresponds to a better dimensional stability.

The expression "lamination" means the application or bonding of a cast polymer membrane or polymer film to a substrate or other material.

The expression "delamination" means the separation of a polymer or cast polymer film from a substrate or other material.

Unless specifically stated otherwise, the expression "film" as used herein refers to a continuous sheet which may or may not be in contact with a substrate. The expression in particular encompasses both membranes and a coating layer.

Unless specifically stated otherwise, the expression "permanently laminated" as used herein refers to a state wherein delamination does not occur between the film and substrate after at least 25 hours, or alternatively at least 29 hours, or alternatively at least 40 hours, or alternatively at least 60 hours, or alternatively at least 100 hours, or alternatively at least 126 hours, or alternatively at least 130 hours or more soaking in water, or alternatively at least 3 days of exposure to humidity of up to 85% relative humidity at a temperature of at least 60° C.

The expression "MVTR" stands for "Moisture Vapor Transmission Rate" which is also known as "WVTR", or "Water Vapor Transmission Rate". As defined by testing standard ASTM E96, MVTR measures the steady water vapor flow in unit time through unit area of a body, normal to specific parallel surfaces, under specific conditions of temperature and humidity at each surface.

Further, all ranges disclosed herein are intended to include any combination of the mentioned upper and lower limits even if the particular combination and range is not specifically listed.

The expression "wrinkle free laminate" means a laminate in which the polymeric film conforms to the surface and contour of the substrate with the substantial absence of wrinkles, ridges or bubbles or other such defects.

According to several embodiments of the present disclosure, it has been surprisingly found that a film cast from a sulfonated block copolymer composition may be permanently laminated to the polar or active metal surface of a substrate. According to several embodiments, the sulfonated block copolymer is cast into a film and exposed to a solvent comprised of water for sufficient time to become partially or fully hydrated with water. The film is then applied to the substrate and then allowed to dry thereby forming a bond with the surface of the substrate. In some embodiments, full hydration is not required, instead the film is hydrated sufficiently that a bond is formed on the polar or active metal substrate surface upon drying. This can be termed for purposes herein as permanent lamination as, after lamination, the membrane does not delaminate in the presence of water even after soaking for long periods of time such as 130 hours or more.

Without being bound to any particular theory it is believed that the wet sulfonic acid functional groups of the block copolymer interact with the polar or active metal surface of the substrate thereby forming a chemical bond between the substrate and the film. Accordingly, with such bond the film is strongly laminated to the substrate without de-laminating in the presence of water, even after soaking for at least 25 hours, or alternatively at least 29 hours, or alternatively at least 40 hours, or alternatively at least 60 hours, or alternatively at least 100 hours, or alternatively at least 126 hours, or alternatively at least 130 hours or more, or alternatively at least 3 days of exposure to humidity of up to 85% relative humidity at a temperature of at least 60° C. Moreover, the film is preferably laminated onto the substrate without wrinkles, thereby leaving a clear coating of film on the substrate.

Due to the strong bonding, the laminated polar or active metal substrate may be used in wet environments such as highly humid environments, air to air heat exchange systems, heat, ventilation and air conditioning applications, and rotary air to air energy exchange systems. The laminates may even be used in water treatment applications where the composite construction is fully immersed in water.

In some embodiments, the sulfonated block copolymers used herein for laminating polar or active metal substrates are described as in U.S. Pat. No. 7,737,224 to Willis et al, the entire disclosure of which is incorporated herein by reference. Furthermore, the sulfonated block polymers as described in U.S. Pat. No. 7,737,224 may be prepared according to the process of WO 2008/089332 to Dado et al. or WO 2009/137678 to Handlin et al., the entire disclosures of which are hereby incorporated by reference.

1. Sulfonated Block Copolymers

The block copolymers for the preparation of the sulfonated block copolymers may be made by a number of different processes, including anionic polymerization, moderated anionic polymerization, cationic polymerization, Ziegler-Natta polymerization, and living chain or stable free radical polymerization. Anionic polymerization is described below in more detail, and in the referenced documents. Moderated anionic polymerization processes for making styrenic block copolymers are disclosed, for example, in U.S. Pat. Nos. 6,391,981, 6,455,651 and 6,492,469, each of which is incorporated herein by reference. Cationic polymerization processes for preparing block copolymers are disclosed, for example, in U.S. Pat. Nos. 6,515,083 and 4,946,899, each of which is incorporated herein by reference.

Living Ziegler-Natta polymerization processes that can be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc., Comm., 2005) describe living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers can be synthesized by living or stable free radical techniques. Nitroxide mediated polymerization methods are preferred living chain or stable free radical polymerization processes when preparing the precursor polymers.

2. Polymer Structure

One aspect of the disclosure relates to the polymer structure of the sulfonated block copolymers. In one embodiment, the sulfonated block copolymers have at least two polymer end or outer blocks A and at least one saturated polymer interior block B wherein each A block is a polymer block which is resistant to sulfonation and each B block is a polymer block which is susceptible to sulfonation.

Preferred structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-D-B)_nX$ or mixtures thereof, where n is an integer from 2 to about 30, X is coupling agent residue and A, B and D are as defined herein below.

Most preferred structures are linear structures such as A-B-A, $(A-B)_2X$, A-B-D-B-A, $(A-B-D)_2X$, A-D-B-D-A, and $(A-D-B)_2X$, and radial structures such as $(A-B)_nX$ and $(A-D-B)_nX$ where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture will include a certain amount of A-B diblock copolymer, in addition to any linear and/or radial polymers. The respective amounts have not been found to be detrimental to the practice of the invention.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymer segments of ethylene, it may be useful to polymerize ethylene via a Ziegler-Natta process, as taught in the references in the review article by G. W. Coates et al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks will typically be between about 1,000 and about 60,000.

When the A blocks are polymers of alpha olefins of 3 to 18 carbon atoms, such polymers are prepared by via a Ziegler-Natta process, as taught in the references in the above-cited review article by G. W. Coates et al. Preferably, the alpha-olefins are propylene, butylene, hexane or octane, with propylene being most preferred. The block molecular weight for each of such alpha-olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosures is herein incorporated by reference.

The A blocks may also be polymer segments of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester. Examples of the anionic polymerizable monomer that can be optionally used include methacrylic or acrylic monomers such as trimethylsilyl methacrylate, N-,N-dimethylmethacrylamide, N,N-diisopropylmethacrylamide, N,N-diethylmethacrylamide, N,N-methylethylmethacrylamide, N,N-di-tert-butylmethacrylamide, trimethylsilyl acrylate, N,N-dimethylacrylamide, N,N-di-isopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers such as those present in the B blocks which are addressed in more detail in the following. In some embodiments, the A blocks may contain up to 10 mol percent, preferably they will contain only up to 5 mol percent, and particularly preferably only up to 2 mol percent of the vinyl aromatic monomers as mentioned for the B blocks. However, in the most preferred embodiments, the A blocks will contain no vinyl monomers as present in the B blocks. The sulfonation level in the A blocks may be from 0 up to 15 mol percent of the total monomers in the A block. It will be understood by those skilled in the art that suitable ranges include any combination of the specified mol percent's even if the specific combination and range is not listed herewith.

The B blocks, in each case, comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers mentioned above, the B blocks may also comprise a partially or completely hydrogenated copolymer of such monomer(s) with a conjugated diene selected from 1,3-butadiene, isoprene and mixtures thereof, having a vinyl content of between 20 and 80 mol percent. These copolymers with partially or completely hydrogenated dienes may be random copolymers, tapered copolymers, block copolymers or controlled distribution copolymers. In one preferred embodiment, the B blocks are selectively partially or completely hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in U.S. Pat. No. 7,169,848, which disclosure is herein incorporated by reference.

U.S. Pat. No. 7,169,848 also discloses the preparation of sulfonated block copolymers. The B blocks comprising a styrene block are described herein. In a preferred embodiment, the B blocks are made up of unsubstituted styrene and will not require a separate hydrogenation step.

In another aspect of the present disclosure, the block copolymer includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof the butadiene portion of the polymer block having a vinyl content prior to hydrogenation of between 20 and 80 mol percent and the polymer block having a number average molecular weight of between 1,000 and 50,000. In other embodiments, the block D comprises a hydrogenated polymer or copolymer of a conjugated diene selected from isoprene, 1,3-butadiene, and mixtures thereof, and has a number average molecular weight of 1,000 to 15,000, or alternatively from 5,000 to 20,000, or alternatively from 10,000 to 25,000, or alternatively from 25,000 to 50,000. Providing such a D block can assist in in making a block copolymer less rigid and more elastomeric.

In another embodiment, the impact modifier block D comprises an acrylate or silicone polymer having a number average molecular weight of 1,000 to 50,000. In still another embodiment, the impact modifier block D block is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that suitable ranges include any combination of the specified mol percents even if the specific combination is not listed herewith.

In a preferred embodiment, the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are such that each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percents even if the specific combination and range is not listed herewith. The level of sulfonation is determined by titration of a dry polymer sample, which has been re-dissolved in tetrahydrofuran with a standardized solution of NaOH in a mixed alcohol and water solvent.

3. Overall Anionic Process to Prepare Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic co-polymerizations include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, each of which disclosures is incorporated herein by reference.

Polymerization conditions to prepare the block copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent,
2) to enhance the thermal stability of the living polymer chain end which permits polymerization at higher temperatures and again, reduces the viscosity of the polymer solution allowing for the use of less solvent, and
3) to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. Nos. 6,391,981, 6,455,651 and 6,492,469, which are herein incorporated by reference. Related information is disclosed in U.S. Pat. Nos. 6,444,767 and 6,686,423, each of which disclosures is incorporated herein by reference. The polymer made by such a moderated, anionic polymerization process can have the same structure as one prepared using the conventional anionic polymerization process and as such, this process can be useful in making the polymers of the present invention. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) polymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents is known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. Nos. 3,985,830, 4,391,949 and 4,444,953; as well as CA 716,645, each of which disclosures is incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and X is the remnant or residue of a coupling agent.

4. Process to Prepare Hydrogenated Block Copolymers.

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the block copolymer to remove any ethylenic unsaturation prior to sulfonation. Hydrogenation generally improves thermal stability, ultraviolet light stability, oxidative stability, and, therefore, weatherability of the final polymer, and reduces of the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. Nos. 3,595,942, 3,634,549, 3,670,054, 3,700,633, and Re. 27,145, the disclosures of which are incorporated herein by reference. These methods operate to hydrogenate polymers containing ethylenic unsaturation and are based upon operation of a suitable catalyst. Such catalyst, or catalyst precursor, preferably comprises a Group 8 to 10 metal such as nickel or cobalt which is combined with a suitable reducing agent such as an aluminum alkyl or hydride of a metal selected from Groups 1, 2, and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds are reduced, and between zero and 10 percent of the arene double bonds are reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen in nitrogen. Care must be exercised in this step to avoid that an explosive mixture of oxygen and hydrocarbons is formed.

5. Process to Make Sulfonated Polymers

There are several methods of preparing the inverted micellar solution of the sulfonated block copolymer in an aprotic polar solvent. Some methods disclosed herein include first preparing the sulfonated block copolymers in non-halogenated aliphatic solvents, and optionally casting them to a membrane as further described below. Once sulfonated in the aliphatic solvents and then optionally cast to a membrane, such sulfonated polymers can then be dissolved in aprotic polar solvents to form a solution having inverted micelles. This second solution can then be cast to form membranes or films.

According to multiple embodiments disclosed herein, the above prepared block copolymers are sulfonated to obtain a sulfonated polymer product dissolved in a non-halogenated aliphatic solution wherein the sulfonated polymer is arranged into a micellar form.

Without being bound by any particular theory, it is the present belief that the micelle structure of the sulfonated block copolymer in a non-halogenated aliphatic solvent can be illustrated according to described as having a core comprising the sulfonated block or blocks having a substantial amount of spent sulfonating agent residues which is surrounded by the sulfonation resistant block or blocks swollen by the organic non-halogenated aliphatic solvent. As will be further described in more detail below, the sulfonated blocks are highly polar due to the presence of sulfonic acid and/or sulfonate ester functional groups. Accordingly, in such solvents the sulfonated blocks are sequestered into a core of the molecule, while the outer sulfonation resistant polymer block forms a shell which is solubilized by a non-halogenated aliphatic solvent. In addition to forming discrete micelles, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

As described herein, micelles can be formed as a result of the sulfonation process, or alternatively, the block copolymer may arrange in a micelle structure prior to sulfonation.

In some embodiments, for the formation of micelles, the sulfonation processes as described in WO 2008/089332 to Dado et al. or WO 2009/137678 to Handlin et al. may be employed. The methods are useful for preparing sulfonated styrenic block copolymers as described in U.S. Pat. No. 7,737,224 to Willis et al.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

a) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates can allow that the sulfonation of the polymer proceeds essentially without disabling gelling at considerably higher concentration than can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach may improve the utility of more polar sulfonation reagents. Such acyl sulfates are further described below.

b) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted is dependent upon the composition of the starting polymer, since the limiting concentration below which polymer gelling is non-disabling or negligible depends upon the polymer composition. As stated above, the limiting concentration may also depend on other factors such as the identity of the solvent or the solvent mixture used and the degree of sulfonation desired. Generally, the polymer concentration falls within the range of from about 1%-wt. to about 30%-wt. alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified weight percents even if the specific combination and range is not listed herewith.

In accordance with some embodiments of the presently described technology, the initial concentration of the precursor polymer or mixture of precursor polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified weight percents even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymers in the reaction mixture may be above the limiting concentration of the precursor polymer.

c) Sulfonation Agent

According to multiple embodiments, acyl sulfate may be used for sulfonating the polymerized block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

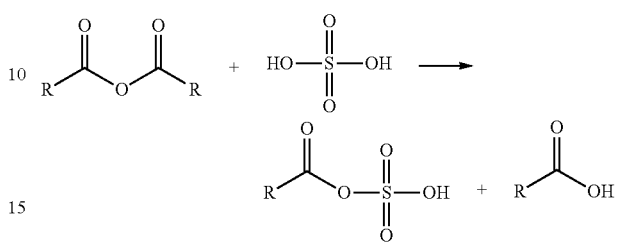

Acyl sulfates are subject to slow decomposition during the course of sulfonation reactions forming alpha-sulfonated carboxylic acids of the following formula:

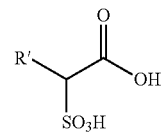

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. Those skilled in the art will recognize that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can also be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

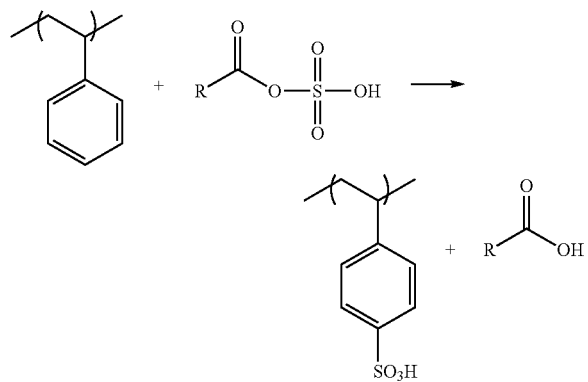

The acyl sulfate reagent may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation (Ionic Exchange Capacity) of the vinyl aromatic monomers susceptible to sulfonation in the block polymers is about 0.4 milliequivalents (meq) sulfonic acid per gram sulfonated polymer (0.4 meq/g) or less, alternatively equal to or less than about 0.6 meq sulfonic acid per gram sulfonated polymer (0.6 meq/g), alternatively equal to or less than about 0.7 meq sulfonic acid per gram sulfonated polymer (0.8 meq/g), alternatively equal to or less than about 1.0 meq sulfonic acid per gram sulfonated polymer (1.0 meq/g), alternatively equal to or less than about 1.2 meq sulfonic acid per gram sulfonated polymer (1.2 meq/g), alternatively equal to or less than about 1.3 meq sulfonic acid per gram sulfonated polymer (1.3 meq/g), alternatively equal to or less than about 1.6 meq sulfonic acid per gram sulfonated polymer (1.6 meq/g), alternatively equal to or less than about 1.8 meq sulfonic acid per gram sulfonated polymer (1.8 meq/g) or less, alternatively equal to or less than about 2.0 meq sulfonic acid per gram sulfonated polymer (2.0 meq/g), alternatively equal to or less than about 2.2 meq sulfonic acid per gram sulfonated polymer (2.2 meq/g), alternatively equal to or less than about 2.5 meq sulfonic acid per gram sulfonated polymer (2.2 meq/g). The most preferred range being 1.0 meq sulfonic acid per gram sulfonated polymer (1.0 meq/g) or less. Another means of describing the sulfonation levels of the polymer refer to mol percent sulfonation. The typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percents even if the specific combination and range is not listed herewith.

The level or degree of sulfonation of a sulfonated polymer can be measured by an NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. Alternatively, the level of sulfonation can be determined by titration of a dry polymer sample, which has been redissolved in tetrahydrofuran with a standardized solution of NaOH in a mixture of alcohol and water. In the latter case, rigorous removal of by-product acids is preferably ensured.

Although embodiments for sulfonating polymers are described above in the context of acyl sulfate reagents, the utility of other sulfonation reagents are also contemplated. For example, the use of those sulfonation reagents derived from the complexation/reaction of sulfur trioxides with phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphous pentoxide, polyphophoric acid, 1,4-dioxane, triethylamine, etc.

d) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

As a result of sulfonation, the micelle cores contain sulfonation susceptible blocks having sulfonic acid and/or sulfonate ester functionality which are surrounded by an outer shell containing sulfonation resistant blocks of the block copolymer. The driving force for this phase segregation (causing the micelle formation) in solution has been attributed to the considerable difference in polarity between the sulfonated block(s) and the non-sulfonated blocks of the sulfonated block copolymer. The latter blocks are freely solvable by a non-halogenated aliphatic solvent, for example the first solvent disclosed above. On the other hand, the sulfonated polymer block(s) may arrange to concentrate in the core of micelle.

f) Film Casting

Once the sulfonation reaction is completed, the block copolymers can be cast directly into a film without the necessity of isolating the block copolymer.

Conventional methods may be used for casting the polymer to form a film. One method used may be referred to as solution casting. According to this procedure, the sulfonated copolymer solution obtained from the sulfonation reaction as described above may be poured onto an inert substrate such as a siliconized glass plate. Excess solution can be removed with a glass rod. The remaining solution is then allowed to dry completely until the solvent has been evaporated thereby leaving a cast film of the sulfonated copolymer. In this particular embodiment the polymeric film (e.g., membrane) can be submerged in water and will retain its form (solid) while in the water. In other words, the block copolymer will not dissolve in water or disperse in water.

6. Polar and Active Metal Substrates

The substrates for use according to the present disclosure for lamination of the sulfonated block copolymer membrane onto the surface thereof includes solid and porous substrates which are capable of interaction and forming a bond (e.g. hydrogen, covalent, ionic) with the sulfonic groups of the membrane. The substrates useful for this purpose are polar or active metal substrates.

Such substrates for use with the sulfonate membranes are those having active metal and/or polar groups or moieties on their surfaces. In particular, polar groups include oxygen containing groups such as hydroxyl groups, carboxyl groups, carbonyl groups, or ether groups. Additionally, polar groups include nitrogen containing groups such as amine, nitrile, sulfonamide or amide groups as well as halogens, including chlorine, fluorine, bromine and iodine. For polymeric substrates, the polar groups or atoms may be part of the main chain or extend therefrom.

Accordingly, polar substrates useful for forming bonds with the membranes formed herein include, metals, metal alloys, glass, silica, concrete, ceramics, paper and other cellulosic materials, various metal oxides, oxidized carbon, genuine and synthetic leather, animal skins, and the like. Further substrates include polymeric substrates having polar linkages in the main chain and/or polar substituents extending from the main chain, such as acrylates, methacrylates, polymethylmethacrylate (PMMA), polyacrylonitriles, polyacrylamides, polyethers, polyesters, polyethylene terephthalate (PET), polyvinyl acetate (PVA), polyvinyl chloride (PVC), polyaminespolyamides, nylon, styrene acrylonitrile polymer (SAN), epoxides, acrylonitrile-butadiene-styrene (ABS), polycarbonates, and the like. Preferably the substrates are untreated with any other compounds, such as waxes, non-polar polymers or other protective coatings, as this may interfere with the interaction between the membrane and the substrate.

Additional substrates having a surface for interacting with the sulfonated block copolymer include metals and half metals and metal alloys. The metals employed for interacting with the films disclosed herein are activated metal and/or passivated metal.

In some embodiments, the metals used will be passivated, namely those that have been subject to oxidation in the presence of air and/or water. As a result, a layer of oxide may form on the surface of the metal thereby forming a polar surface. Accordingly, the sulfonic acid functional groups of a partially or fully hydrated block copolymer film may interact with partially or fully oxidized surface of the metal. Metals employed can include metals in groups 2 through 13 of the periodic table including those in rows 2-4 of the periodic table. The metals are employed with a view toward particular applications, and thus those which may be formed into sheets or foils are preferred.

In other embodiments, the preferred metals to be employed include those which have a tendency to interact directly with the sulfonic functional groups of the sulfonated block copolymer membrane. In such embodiments, the preferred metals are those which are highly active, are strong reducing agents and which are more likely to react with acids. Accordingly such metals are high in the so called Activity Series of elements. Specifically such metals include Li, K, Ba, Ca, Na, Mg, Al, Zn, Cr, Fe, Cd, Co, Ni, Sn, and Pb with the first mentioned metals being the highest in activity and each succeeding metal being less active. Care must be exercised in handling metallic Li, K, Ba, Ca, Na, and Mg as these metals can spontaneously ignite in the presence of air. The activate metals can be used alone or in combination with metals as an alloy or in composites containing non-metals. The most preferred metal for use in accordance with the present disclosure being Al due not only to its high activity but also its broad use across many applications.

The substrates may contain non-metal fillers or other materials thus forming composited materials or alloys. However if other materials are present in the substrate, the metal should be provided on the surface of the substrate in a sufficient amount so as to allow interaction between, and bonding of, the saturated or partially saturated sulfonated block copolymer film and the substrate surface.

In some embodiments, it is believed, while not being held to any particular theory, that the sulfonic groups react with the activated zero valent metal on the surface of an activated metal substrate. As shown in the equation below, a sulfonic group extending from the polymer chain R contains a hydroxyl group. The zero valent metal M° reacts with the oxygen thereby displacing the hydrogen atom:

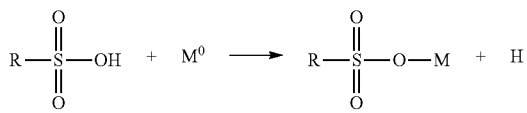

The R group in the above is the polymer chain. By this mechanism a strong bond is formed between the sulfonic group and the metal thus forming what can be termed for purposes herein as a permanent bond between the sulfonated block copolymer membrane and metal substrate. Shown in FIG. 1 is an illustration of the interaction of the sulfonic functionalities with aluminum as the metal substrate.

As mentioned glass is a polar substrate which may be used for lamination with the sulfonated block copolymer membranes disclosed herein. Without being bound by any particular theory, it is believed that the molecular structure of glass is such that it contains oxygen atoms, and in particular multiple Si—O bonds are believed to interact with the sulfonic groups of the membrane. As shown in the equation below, the sulfonic group reacts with siloxyl groups on the surface of the glass forming sulfonate ester bonds.

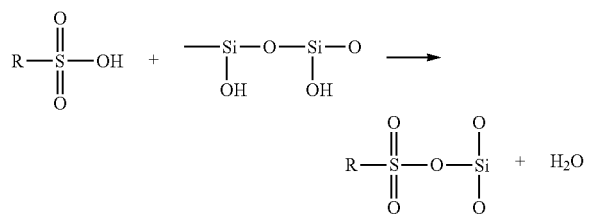

By this mechanism a strong bond is formed between the sulfonic group and the silicon atom thus forming what can be termed for purposes herein as a permanent lamination between the sulfonated block copolymer membrane and glass substrate.

The interaction of the metal and glass substrates as noted in the above equations is equally applicable to other substrates which have a polar functionality. In such cases, the hydroxyl group of the sulfonic acid reacts with the polar group which in turn displaces the hydrogen atom of the hydroxyl group thus forming a strong bond.

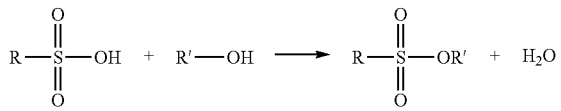

Figure 2:
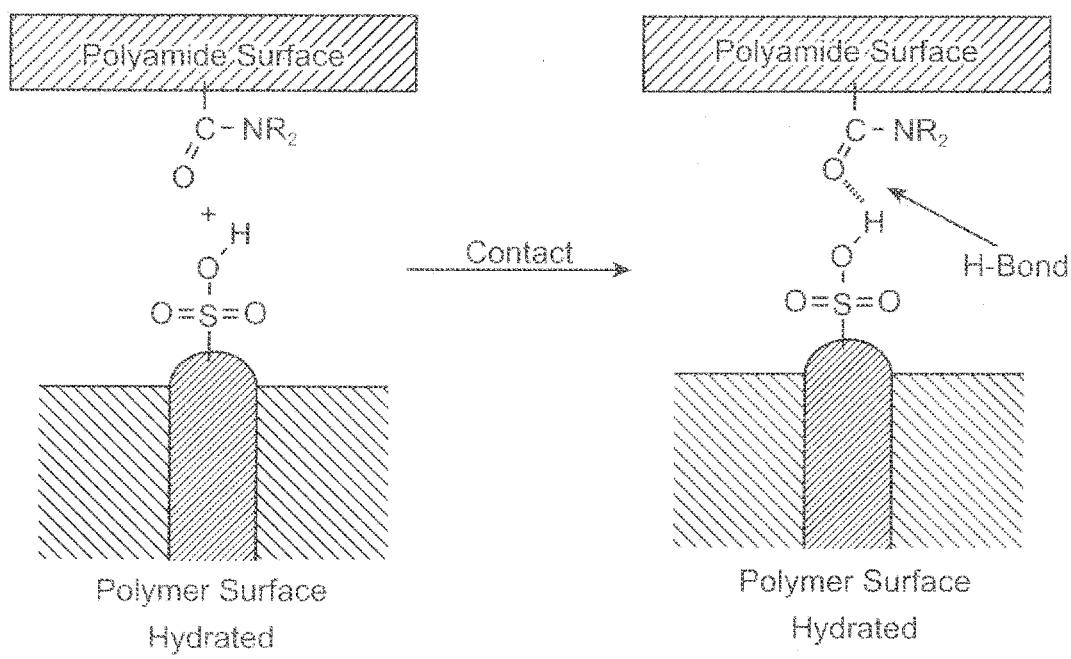
FIG. 2 is a schematic illustration of the interaction of sulfonated block copolymer membrane with a polyamide substrate.

The above concept is further illustrated in FIG. 2, wherein the sulfonic functionality reacts with a polyamide surface to form a hydrogen bond.

Figure 3:
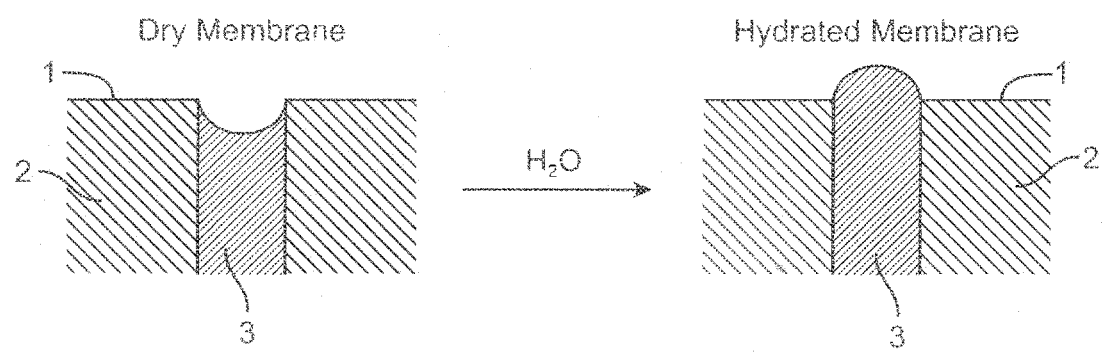
FIG. 3 is a schematic illustration of the sulfonated block copolymer membrane in both the dry and hydrated states and the response of the ionic phase with respect to the surface of the membrane as a result of exposure to water.

Furthermore, without being bound by any particular theory, it is believed that the structure of the membrane changes when saturated with water. As noted previously, the sulfonated block copolymer membranes are made up of an ionic phase comprising the segments having sulfonic acid as well as a non-polar rigid plastic phase comprised of segments of the non-sulfonated segments. A cross section of membrane made up of the ionic phase 1 and the rigid plastic phase 2 is represented schematically in FIG. 3. When the membrane is dry, the ionic phase 1 is even with or is distended below surface 3 of the membrane as shown in the left portion of FIG. 3. However, because the ionic phase is readily swollen with water, when the membrane is wetted, the ionic phase 1 absorbs the water and expands thereby extending beyond the surface 3 of the membrane as illustrated for example on the right side portion of FIG. 3.

Figure 4:
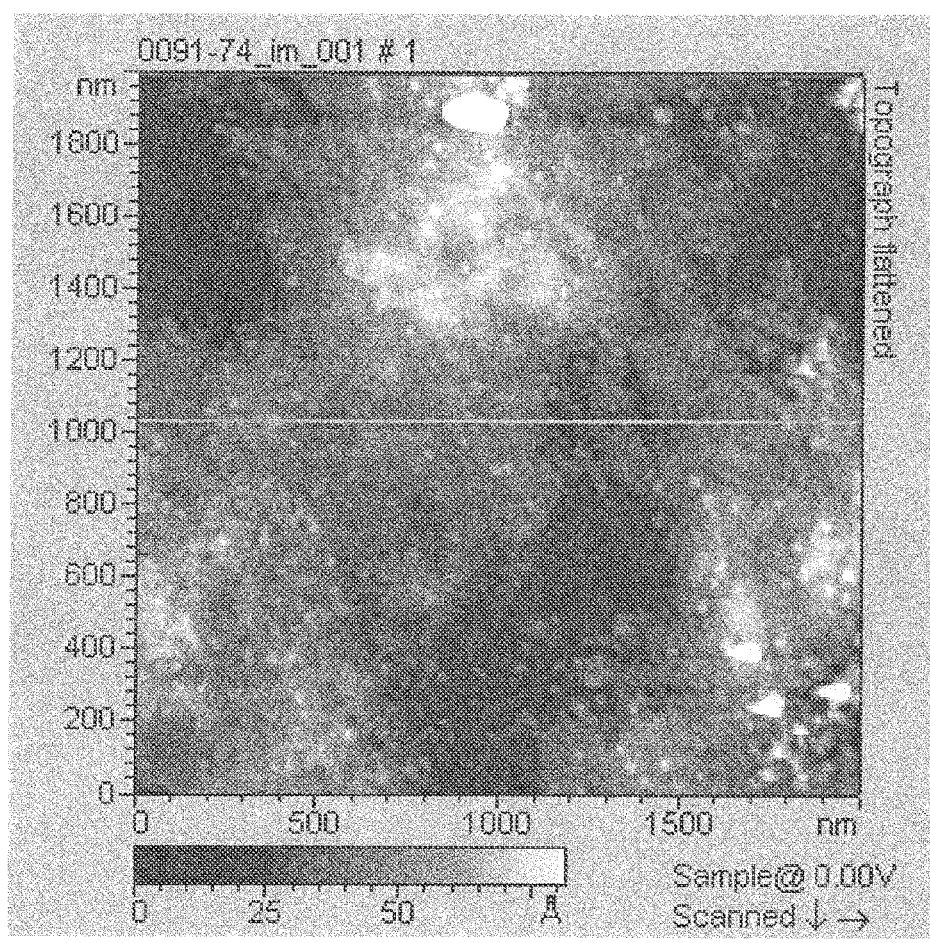
FIG. 4 is an atomic forces micrograph (height image) of a dry sulfonated block copolymer membrane.
Figure 5:
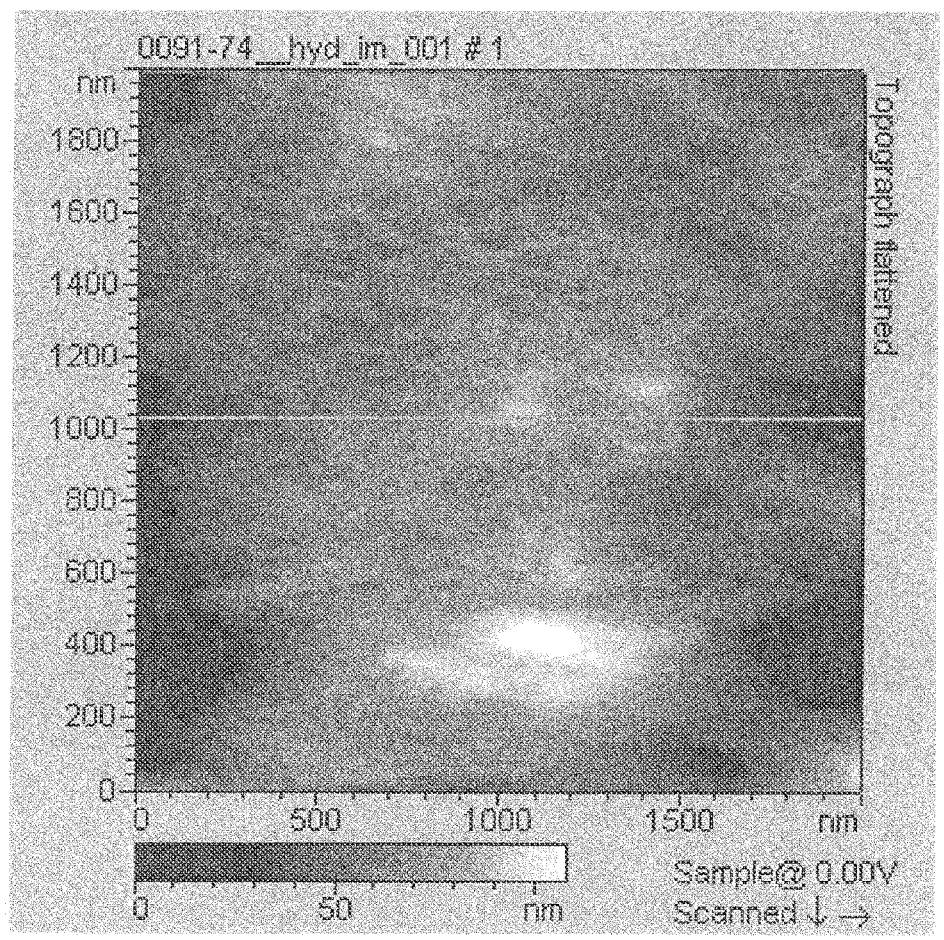
FIG. 5 is an atomic forces micrograph (height image) of a hydrated sulfonated block copolymer membrane.

For further illustration, FIG. 4 is provided showing a micrograph image of a dry sample of a sulfonated block copolymer membrane. The height image is indicative of a relatively flat and featureless membrane surface. The range on the scale bar, from the dark to lighter regions is only 75 angstroms. Accordingly, it is believed the ionic phase does not extend above the surface of the dry membrane. Additionally. FIG. 5 shows the micrograph image of a hydrated sample of a sulfonated block copolymer membrane. This height image shows a water swollen, soft, ion microphase in a honeycomb-like structure which is elevated above the surface of the membrane. The range on the scale bar, from dark to lighter regions, is over 1000 angstroms (over 100 nanometers). The surface of this hydrated membrane is highly textured. The dark dispersed phase is the rigid, plastic microphase of the selectively sulfonated block copolymer. This phase is recessed below the hydrated, sulfonated polystyrene microphase of the membrane. Therefore, in the hydrated state, it is believed that the ionic phase extends above the surface of the membrane.

The change in the position of the ionic phase relative the surface of the membrane as result of hydration may, at least in part, account for the strong bonding obtained by lamination. As the ionic phase extends beyond the surface of the membrane when hydrated, the ionic phase is able to come into contact with the surface of a substrate being applied thereon. As the ionic phase contains sulfonic functionalities, the interaction and/or reaction between these functional groups and the polar groups and metals on the surface of the substrate is able to take place. The interaction of the sulfonic functionalities and the polar groups and active metals on the surface of the substrate is thought to provide a strong laminated bond between the membrane and the substrate.

7. Lamination

The film cast from the sulfonated block copolymer is laminated onto the polar or active metal substrate. This is carried out by exposing the film to a solvent sufficient to partially or fully hydrate the film.

The solvent employed for lamination disclosed herein is water. Water as the preferred solvent can be employed alone or in combination with minor amounts of other solvents added thereto. Water for use as a solvent may include minor amounts of impurities and accordingly typical tap water is sufficient. However, the water source includes spring, distilled, purified, filtered or deionized or other forms of treated or untreated water. Even with minor amounts of other impurities as those typically found in natural water such as salts, sodium or potassium salts, chlorine or various metal ions water can be successfully employed for lamination as disclosed herein. The water should be sufficiently clean such that any impurities do not interfere with the interaction with the film or sulfonic functionalities.

Additionally, the water may have other polar solvents added thereto. Additional polar solvents include those which do not degrade the membrane or substantially interfere with the intrinsic properties of the membrane upon drying (such as moisture vapor transmission rate "MVTR"). Polar solvents include, alcohols, diols, esters, ethers, ketones, aldehydes, esters of carboxylic acids, acrylates and contain from 1 to 20 carbon atoms, preferably from 1 to 8 carbon atoms, preferably from 1 to 4 carbon atoms, and can be linear, branched, cyclic, aliphatic or aromatic. Preferably, any additional solvents are miscible with water. It will be understood that high levels of water concentration should be used to avoid wrinkled or hazy film and potential delamination in the presence of water.

The film may be exposed to the solvent by conventional methods known in the art. One method includes a bath, where the solvent is poured into a container and the film is soaked in the solvent. The film can be soaked in the bath for from a few seconds to 100 hours until the film is sufficiently hydrated. At the least, the film can fully hydrated after 24 hours of soaking in a water bath. The time period to reach full hydration depends on factors such as the thickness of the film. Furthermore, the point at which the film is fully hydrated is also the point at which equilibrium is reached.

Other methods may include spraying the film with water or subjecting the film to water vapor by means of jets or mists. Further methods may also be providing the film in moist or humid air for sufficient periods to partially or fully hydrate the film, or use of a squeegee. In these ways water may be absorbed into the film.

In some embodiments, the film will be fully (i.e. 100%) hydrated with solvent. In order for the film to be successfully laminated to the polar or active metal substrate it is not required that the film be fully hydrated. The film should be sufficiently wetted such that the film interacts with the polar or active metal substrate to form a bond upon drying. In some embodiments, the film may be partially hydrated. For example, in some embodiments, the film may be at least 25% hydrated, alternatively at least 30% hydrated, alternatively at least 50% hydrated, alternatively at least 60% hydrated, alternatively at least 75% hydrated, alternatively at least 90% hydrated. Depending on the thickness of the film, sulfonation level, surface morphology, temperature and other factors, the film may be sufficiently hydrated for purposes of lamination even after a few seconds of soaking in water or other water application method.

Another method for determining the amount of water sufficient for laminating the membrane to the substrate is by water uptake values. In some embodiments, the water uptake value should be at least 10%, alternatively at least 20%, alternatively at least 25%, alternatively at least 35%, alternatively at least 50%, alternatively at least 80%. The block copolymers of the present disclosure have low water uptake values. Accordingly, the maximum water uptake value may be less than 150%, alternatively less than 125%, alternatively less than 100%, alternatively less than 80%, alternatively less than 40%. Accordingly, when fully hydrated, the maximum water uptake value will be reached. And thus, lower water uptake values may be employed in the ranges just described in order to obtain lamination to the polar or active metal substrate.

After the film absorbs a sufficient amount of solvent, the film can be applied directly to the substrate. The film should be laid flat onto the substrate and arranged to avoid trapping air bubbles. A glass rod can be applied to further flatten the film onto the substrate. Conventional methods known in the art can be employed for applying the film to the substrate including presses, roller assemblies or by hand.

After applying the film to the substrate, it is left to dry. The time of time for drying is dependent on the type and amount of solvent, temperature, and humidity of the air and therefore can be from about 1 minute to 24 hours or more. Warm dry air can used to speed drying. As discussed above, as the film dries it forms bonds with the polar or active metal surface of the substrate.

After drying, the laminates according to the present disclosure are strongly bonded to the polar or active metal substrate. The strong bonding of the substrate and polymeric film yields wrinkle free laminates where the polymeric film substantially conforms to all surface features of the substrate without wrinkles, ridges, bubbles or other such defects. The films do not de-laminate even when exposed to water for long periods of time, for example at least 29 hours or more, alternatively, 100 hours or more, alternatively 118 hours or more, alternatively 126 hours or more, alternatively 200 hours or more. Accordingly, the laminates according to the present disclosure are useful for a variety of applications.

One application includes use in air to air energy exchange systems, for example, total enthalpy air to air rotary energy exchangers as disclosed in U.S. Pat. No. 4,769,053 which his incorporated herein by reference in its entirety. The laminates disclosed herein may be employed as the energy exchange media thus avoiding the need for desiccants as typically used in the art. The films as disclosed have high MVTR rates and thus provide a significant advantage in such energy exchange systems. As air streams are passed through a rotary heat exchanger, the films as disclosed herein are capable of absorbing the latent heat from a humid air stream and releasing the absorbed latent heat into a dry air stream. Accordingly, efficient heat exchange is facilitated by the laminates as disclosed herein.

Additional applications include various water filtration and water deionization processes where these membranes have demonstrated superior separation performance. The composites formed by the lamination technique disclosed herein have improved burst strength and additionally, the contour of the laminated structure improves water flow over the surface of the membrane. Fabrics, particularly nylon and nylon-cotton blend based fabrics, can have membranes attached to their surface using the water activated adhesion method of this disclosure. The membranes herein can also be laminated to substrates herein for decorative purposes, such as decals, or for functional applications where the membrane is employed as an electrode or a sensor or for water transport to aid in perspiration or for rejection of toxic agents. The water activated lamination process disclosed herein can be used to modify additional solid surfaces, as well. The benefit of using water to "glue" (i.e. laminate) the membranes onto solid surfaces such as concrete, various engineering thermoplastics (like polyesters, nylons, polyethers), or metal surfaces could be for improved skid resistance, enhance decorability, strengthening of surfaces, promoting electrical transport performance, or even to repel rain. Various medical applications of the disclosed laminating technique are also encompassed, for example the laminates maybe useful for bandages for wounds. Furthermore, the water activated bonding technique disclosed herein can be used to laminate a membrane to the surface of paper, and thus useful for labels or stamps, as well as many other applications.

8. Additional Components

Further, the copolymers disclosed herein can be compounded with other components not adversely affecting the copolymer properties or the membrane formed from the sulfonated block copolymer. Further, the disclosed block copolymers may be blended with a large variety of other polymers, including olefin polymers, styrene polymers, tackifying resins, hydrophilic polymers and engineering thermoplastic resins, with polymer liquids such ionic liquids, natural oils, fragrances, and with fillers such as nanoclays, carbon nanotubes, fullerenes, and traditional fillers such as talcs, silica and the like.

In addition, the sulfonated polymers of the present invention may be blended with conventional styrene/diene and hydrogenated styrene/diene block copolymers, such as the styrene block copolymers available from Kraton Polymers LLC. These styrene block copolymers include linear hydrogenated and non-hydrogenated S-B-S, S-I-S, S-EB-S, S-EP-S block copolymers. Also included are radial block copolymers based on styrene along with isoprene and/or butadiene and selectively hydrogenated radial block copolymers.

Additionally, the styrene block copolymers S-B-S, S-I-S, S-EB-S, S-EP-S may be functionalized, for example with a monocarboxylic or polycarboxylic acid compound, such as maleic acid or a derivative such as maleic anhydride. The preferred acid compounds are unsaturated monocarboxylic and polycarboxylic-containing acids ($C_3$-$C_{10}$) with preferably at least one olefinic unsaturation, and anhydrides, salts, esters, ethers and other substituted derivatives from such acids. Examples of such materials include maleic acid, fumaric acid, itaconic acid, citraconic acid, acrylic acid, acrylic polyethers, acrylic anhydride, methacrylic acid, crotonic acid, isocrotonic acid, mesaconic acid, angelic acid, maleic anhydride, itaconic anhydride and citraconic anhydride. The preferred monomers for functionalizing styrenic block copolymers are maleic anhydride, maleic acid, fumaric acid and their derivatives. These functionalized styrenic block copolymers (F-SBC) may be blended with the sulfonated block copolymer (SBC) in a ratio (F-SBC/SBC) of 20/80 to 80/20, more preferably from 30/70 to 70/30 or most preferably 60/40 to 40/60. Additionally, other acid functionalities may be used as well as known as the art.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially randomethylene/styrene copolymers, preferably containing at least 20, more preferably equal to or greater than 25 weight percent copolymerized styrene monomer.

Exemplary materials that could be used as additional components would include, without limitation:
1) pigments, antioxidants, stabilizers, surfactants, and flow promoters;
2) particulates, fillers and oils; and
3) solvents and other materials added to enhance processability and handling of the composition.

With regard to the pigments, antioxidants, stabilizers, surfactants, and flow promoters, these components, when utilized in compositions with the sulfonated block copolymers of the present invention may be included in amounts up to and including 10%, i.e., from 0 to 10%, based on the total weight of the composition. When any one or more of these components are present, they may be present in an amount from about 0.001 to about 5%, and even more preferably from about 0.001 to about 1%.

With regard to particulates, fillers and oils, such components may be present in an amount up to and including 80%, from 0 to 80%, based on the total weight of the composition. When any one or more of these components are present, they may be present in an amount from about 5 to about 50%, preferably from about 7 to about 50%.

Illustrative Embodiments

The following examples are intended to be illustrative only, and are not intended to be, nor should they be construed as, limiting the scope of the present invention in any way.

a. Materials and Methods

Degree of Sulfonation:

The degree of sulfonation as described herein and as determined by titration was measured by the following potentiometric titration procedure. The sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by 1H-NMR was measured using the following procedure. About two (2) grams of non-neutralized sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-$d_8$ (THF-$d_8$), to which was then added with a partial drop of concentrated $H_2SO_4$ to shift interfering labile proton signals downfield away from aromatic proton signals in subsequent NMR analysis. The resulting solution was analyzed by $^1$H-NMR at about 60° C. The percentage styrene sulfonation was calculated from the integration of $^1$H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butylstyrene aromatic protons.

The ion exchange capacity as described herein was determined by the potentiometric titration method described above and was reported as milliequivalents of sulfonic acid functionality per gram of sulfonated block copolymer.

b. Experiments

Preparation of Sulfonated Block Copolymer SBC-1

A pentablock copolymer having the configuration A-D-B-D-A was prepared by sequential anionic polymerization where the A blocks are polymer blocks of para-tert-butyl-styrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene having a molecular weight of 28,000 g/mol. To this solution was added another aliquot of isoprene monomer resulting in an isoprene block having a molecular weight of 11,000 g/mol. Accordingly, this afforded a living tetrablock copolymer structure (ptBS-Ip-S-Ip-Li). A second aliquot of para-tert butylstyrene monomer was added, and polymerization thereof was terminated by adding methanol to obtain a ptBS block having a molecular weight of about 14,000 g/mol. The ptBS-Ip-S-Ip-ptBS was then hydrogenated using a standard $Co^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride) The resulting polymer was found, by potentiometric titration, to have an "Ion Exchange Capacity (IEC)" of 2.0 meq of —$SO_3H$/g of polymer. The solution of sulfonated polymer had a solids level of about 10% wt/wt. in a mixture of heptane, cyclohexane, and ethyl i-butyrate.

Films of the compositions prepared as described above were cast against siliconized glass plates at room temperature in a box with a nitrogen purge. Films were allowed to dry in this manner for a period of at least 16 hours. No further post-treatments of the film were performed except those specifically required by particular testing procedures. Typical film thicknesses obtained by this procedure range from 0.25 to 2.0 mils.

For certain examples, films were cast directly onto the substrate. In such cases, after the polymer was formed by reaction it was still in solution. This solution was then poured onto the substrate and left to dry. This is referred to as solution casting.

Additionally, thermal lamination refers to providing a cast film from SBC-1 along with the substrate and providing them in a press under a temperature of above 240° F. and 400 Psi. The pressure and heat act to laminate the film onto the substrate.

As used here in the examples, brush lamination refers to applying solvent to cast films by means of a brush. With solvents such as cyclohexane, the film may dissolve if soaked in the solvent. Accordingly, by brushing the film the solvent can be absorbed into the film for testing. Thereafter, the film is applied to the substrate and then allowed to dry.

As used here in the examples water lamination refers to soaking a cast film in water bath until at least partially hydrated. The film is then applied to the substrate and then allowed to dry until bonded to the substrate.

Films cast from SBC-1 were dissolved and solution cast onto an aluminum substrate as shown in 1a and 2a of Table 1 below and thermally cast as shown in 3a. These were all then soaked in water for the noted time period.

TABLE 1

| Example | Film | Substrate | solution | Method | Time soaked in water | Delaminate |
|---|---|---|---|---|---|---|
| 1a | 0.5 mil SBC-1 | Al | 10% SBC-1 in Cyclohexane | Solution Cast | 5-10 min | Yes |
| 2a | 1 mil SBC-1 | Al | 15% SBC-1 in THF/EtOH | Solution Cast | 3 hours | Yes |
| 3a | 0.5 mil SBC-1 | Al | None | Thermal lamination | 1-2 min | Yes |

Figure 6:
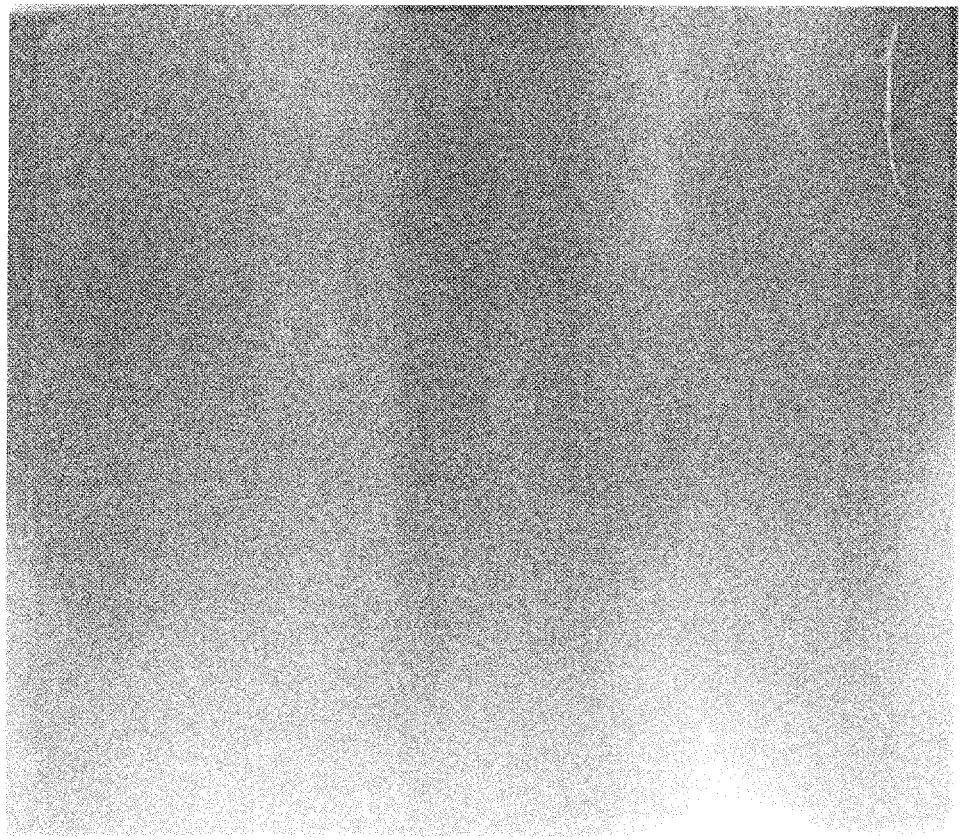
FIG. 6 is a photograph of SBC-1 film directly cast on onto an aluminum substrate using cyclohexane as a laminating solvent.

Each of the films in table 1 delaminated after soaking in water. Furthermore, Example 1a, which was solution cast with cyclohexane as a solvent formed a hazy laminate as shown in FIG. 6. After delamination, and while still wet with water, these were then re-applied back onto the corresponding substrate. After being allowed to dry in air at ambient temperature overnight and they were again placed in a water bath. As shown in Table 2, the effect was that none of the films delaminated after water casting.

TABLE 2

| Example | Film | Substrate | Solution | Method | Time soaked in water | Delaminate |
|---|---|---|---|---|---|---|
| 1b | 0.5 mil SBC-1 | Al | Water | Water lamination | 48 hours | No |
| 2b | 1 mil SBC-1 | Al | Water | Water lamination | 48 hours | No |
| 3b | 0.5 mil SBC-1 | Al | Water | Water lamination | 48 hours | No |

As shown in Table 3, further laminates were tested for stability in water. In each of the cases in Table 3, the film delaminated after being soaked in water for up to 90 mins.

TABLE 3

| Example | Film | Substrate | Solution | Method | Time soaked in water | Delaminate |
|---|---|---|---|---|---|---|
| 4a | 1.0 mil SBC-1 | Al | 10% SBC-1 in Cyclohexane | Solution Cast | about 1 min | Yes |
| 5a | 1.0 mil SBC-1 | Al | 15% SBC-1 in THF/EtOH | Solution Cast | about 1 min | Yes |
| 6a | 0.5 mil SBC-1 | Al | — | Thermal lamination | 1-2 mins | Yes |
| 7a | 1.0 mil SBC-1 | Al | 10% SBC-1 in cyclohexane | Solution Cast | 1-2 mins | Yes |
| 8a | 1.0 mil SBC-1 | Al | 15% SBC-1 in THF/EtOH | Solution Cast | 90 mins | Yes |
| 9a | 0.5 mil SBC-1 | Al | 15% SBC-1 in THF/EtOH | Solution Cast | 15 mins | Yes |

Each of the films in table 3 delaminated after soaking in water. However, after delamination, and while still wet with water, the films were then re-applied back onto the corresponding substrate. After being allowed to dry in air at ambient temperature overnight they were then laminated onto the respective substrates. Thereafter, the laminates were again placed in a water bath in order to test for their ability to maintain bonding. As shown in Table 4, none of the films delaminated after water lamination.

TABLE 4

| Example | Film | Substrate | Solution | Method | Time soaked in water | Delaminate |
|---|---|---|---|---|---|---|
| 4b | 1.0 mil SBC-1 | Al | Water | Water lamination | 126 Hours | No |
| 5b | 1.0 mil SBC-1 | Al | Water | Water lamination | 126 Hours | No |
| 6b | 0.5 mil SBC-1 | Al | Water | Water lamination | 126 Hours | No |
| 7b | 1.0 mil SBC-1 | Al | Water | Water lamination | 126 Hours | No |
| 8b | 1.0 mil SBC-1 | Al | Water | Water lamination | 126 Hours | No |
| 9b | 0.5 mil SBC-1 | Al | Water | Water lamination | 126 Hours | No |

Figure 7:
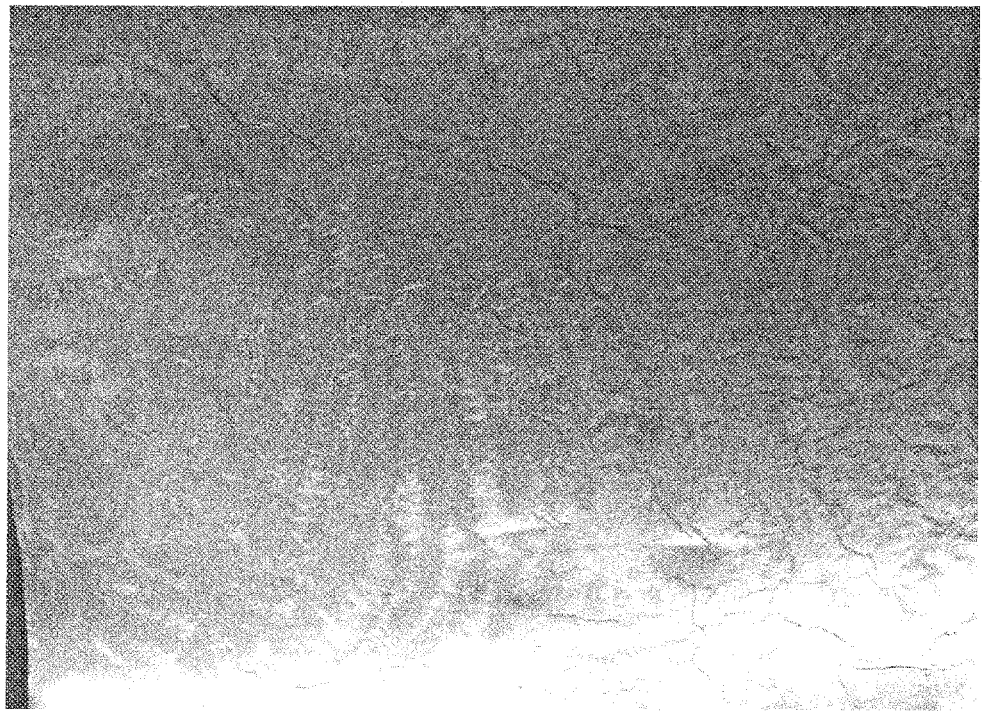
FIG. 7 is a photograph of SBC-1 film laminated to aluminum after having used 1-propanol as a laminating solvent.

Films were cast from SBC-1 and then tested with various solvents as shown in Table 5 below. In Examples 10-15, the solvents were applied to the cast films and then dried onto the aluminum substrates. Each of the films in Examples 10-15 formed wrinkled films upon drying and laminating to the aluminum substrate. The wrinkled nature of the films indicated poor bonding with the substrate. For example, when 1-propanol is employed as a solvent with an aluminum substrate, wrinkles are formed as shown in FIG. 7. After lamination, the samples were soaked in a water bath. As shown in Table 5, the laminates in examples 10-15 delaminated after less than 2 hours.

TABLE 5

| Example | Film | Substrate | solution | Method | Time soaked in water | Delaminate |
|---|---|---|---|---|---|---|
| 10 | 0.5 mil SBC-1 | Al | Cyclohexane | Brush | <30 min | Yes |
| 11 | 0.5 mil SBC-1 | Al | THF | Brush | <30 min | Yes |
| 12 | 0.5 mil SBC-1 | Al | Acetone | Brush | <30 min | Yes |
| 13 | 0.5 mil SBC-1 | Al | Isopropanol | Brush | <30 min | Yes |
| 14 | 0.5 mil SBC-1 | Al | Acetic acid | Brush | <2 hours | Yes |
| 15 | 0.5 mil SBC-1 | Al | 1-propanol | Brush | <30 min | Yes |
| 16 | 0.5 mil SBC-1 | Al | water | Water lamination | >118 hours | No |
| 17 | 0.5 mil SBC-1 | Al | water | Water lamination | >118 hours | No |

Figure 8:
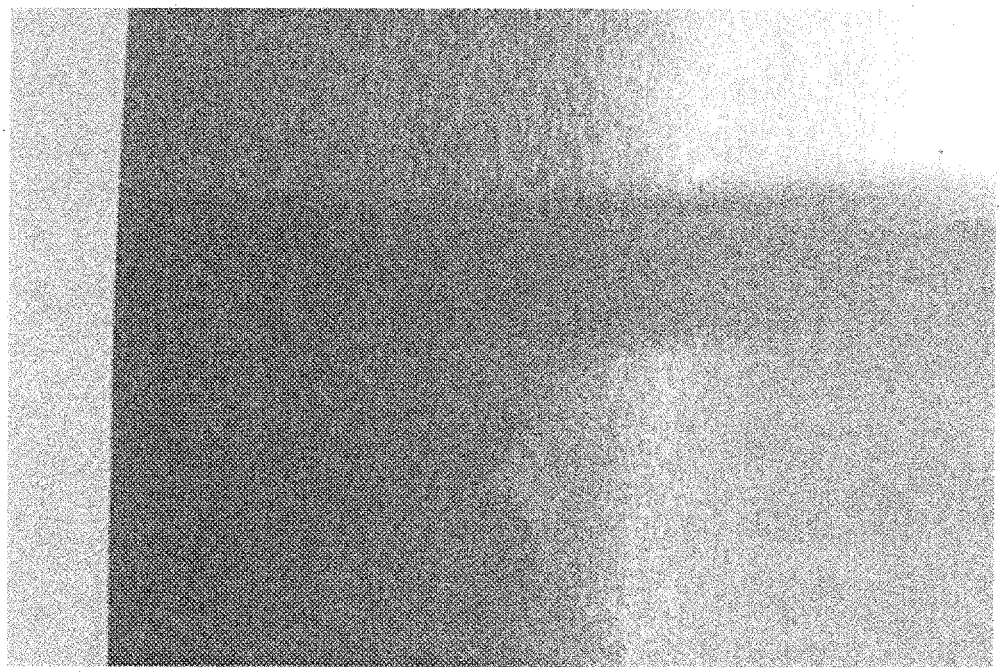
FIG. 8 is a photograph of SBC-1 film laminated to aluminum after having used water as a laminating solvent.

Also shown in Table 5 are examples 16 and 17 where laminates were formed after soaking the films in water and drying onto aluminum substrates. The films did not delaminate even after 118 hours of soaking in a water bath. Furthermore, the laminates formed are transparent, clear and wrinkle free as shown in FIG. 8. Therefore, it has been surprisingly found that employing a water solvent obtained significantly superior laminate properties, including clear, non-wrinkled films that do not de-laminate in the presence of water.

TABLE 6

| Example | Film | Substrate | solution | Method | Time soaked in water | Delaminate |
|---|---|---|---|---|---|---|
| 18 | 0.5 mil SBC-1 | Genuine leather | water | Water lamination | >74 Hours | No |
| 19 | 0.5 mil SBC-1 | Cowhide | water | Water lamination | >74 Hours | Yes |
| 20 | 0.5 mil SBC-1 | Glass | water | Water lamination | >29 Hours | No |

Figure 9:
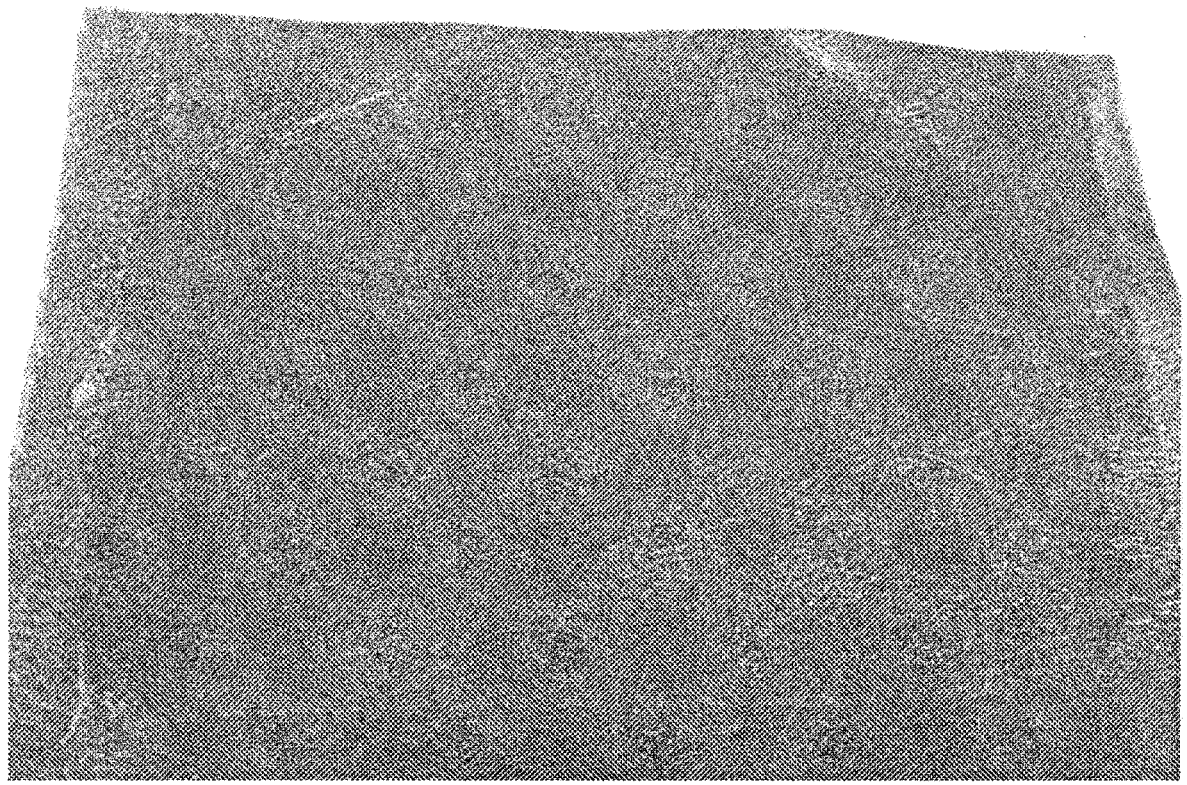
FIG. 9 is a photograph of SBC-1 film laminated to genuine leather after having used water as a laminating solvent.
Figure 10:
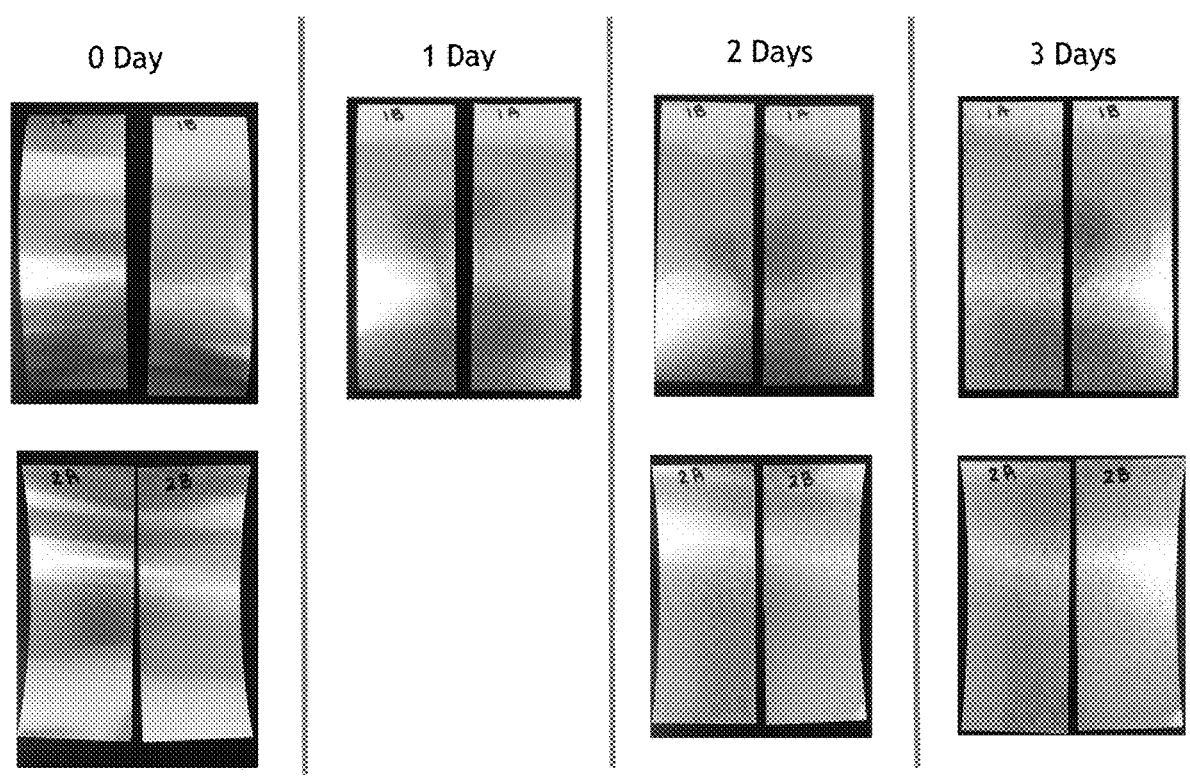
FIG. 10 shows photographs of duplicate samples of aluminum laminates of the block copolymer film SBC-1, taken during the delamination test in the humidity chamber.

As shown in Table 6, applying a water solvent for lamination, the substrates comprised of genuine leather did not delaminate even after 74 hours. A photograph of laminated genuine leather is shown in FIG. 9. While cowhide was shown to delaminate, it is likely due to surface treatment. Surface treatments tend to be a non-polar substance (i.e. wax) for water proofing and protection thereby preventing interaction of the film with the polar portions of the substrate. Also shown in table 6 is lamination onto glass, and to which delamination did not occur even up to 29 hours. Accordingly, it is surprisingly found that strong bonding can be obtained with leather and glass by use of water as a solvent.

TABLE 7

| Example | Film | Substrate | Solution | Method | Time soaked in water | Delaminate |
|---|---|---|---|---|---|---|
| 21 | 0.5 mil SBC-1 | PVC Plaque | H2O | Water lamination | >73 Hours | No |
| 22 | 0.5 mil SBC-1 | Acrylic PVC Plaque (textured surface) | H2O | Water lamination | ~5 min | Yes |
| 23 | 0.5 mil SBC-1 | Acrylic PVC Plaque (smoother surface) | H2O | Water lamination | >73 hours | No |
| 24 | 0.5 mil SBC-1 | Structural Fiberglass Plaque | H2O | Water lamination | ~29 Hours | Yes |
| 25 | 0.5 mil SBC-1 | (Polyetherimide, PEI) Plaque | H2O | Water lamination | >73 Hours | No |
| 26 | 0.5 mil SBC-1 | fiberglass reinforced PET Plaque (rough surface) | H2O | Water lamination | >73 Hours | No |
| 27 | 0.5 mil SBC-1 | Polystyrene (PS) Plaque | H2O | Water lamination | — | Poor bonding |
| 28 | 0.5 mil SBC-1 | Polyester (PET) Plaque (rough surfaces) | H2O | Water lamination | — | Poor bonding |
| 29 | 0.5 mil SBC-1 | Polyvinylidene Fluoride (PVDF) Plaque (rough surfaces) | H2O | Water lamination | — | Poor bonding |

There is shown in the Table 7 lamination of SBC-1 onto polymeric polar substrates. As illustrated lamination was successfully conducted with PVC, PEI and fiberglass reinforced PET polymeric substrates. Additionally, Table 7 demonstrates that the type of surface can affect lamination properties. For example lamination onto smooth surface PVC was maintained even after 73 hours, whereas with textured surface PVC, delamination occurred. Moreover, other factors such as reinforcement can affect lamination. For example, fiberglass reinforced PET maintained lamination even after 73 hours of water soaking, whereas Polyester PET resulted in poor bonding. Accordingly, it is surprisingly found that strong bonding can be obtained with to polar polymeric substrates by use of water as a solvent.

The permanent laminate of the sulfonated block copolymer film resists delamination even under prolonged heating in a high humidity environment. In an embodiment, the copolymer film laminated on a metal surface resists delamination at a temperature of at least 60° C. and a relative humidity of up to 85%. In another embodiment, the copolymer film resists delamination at a temperature from ambient to 60° C. at a relative humidity of up to 85%.

A sample of the sulfonated block copolymer sample, SBC-1, was applied as a 0.5 mil thick film bonded to a 2 mil thick aluminum sheet, and then allowed to dry, thereby forming a permanent laminate. Duplicate samples of the laminate were then placed in a humidity chamber maintained at 60° C. at a maximum chamber setting of 85% relative humidity. After 3 days, the laminates were taken out and examined visually. As can be seen from the photographs below (IA and 1B are the duplicate samples of polymer-laminated aluminum sheets), no visible sign of delamination of the block copolymer film from the aluminum surface was observed in both samples. The polymer film could not be peeled from the metal after the experiments. These results show that the sulfonate block copolymer film forms a permanent laminate that will not delaminate even after prolonged heating at supra-ambient temperatures of up to 60° C., or even higher, in a high humidity environment.

What is claimed is:

1. A permanent laminate formed by a process comprising:
   providing a film consisting essentially of a sulfonated block copolymer having at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units,
   wherein the sulfonated block copolymer has a general configuration A-B-A, A-B-A-B-A, (A-B-A)nX, (A-B)nX, A-D-B-D-A, A-B-D-B-A, (A-D-B)nX, (A-B-D)nX or mixtures thereof,
   wherein n is an integer from 2 to about 30, and X is a coupling agent residue,
   wherein each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) a polymerized isobutylene and (v) mixtures thereof, wherein any segments containing polymerized 1,3-butadiene or isoprene are subsequently hydrogenated;
   and wherein the plurality of A blocks, B blocks, or D blocks are the same or different,
   exposing the film to water to obtain a partially or fully hydrated film,
   applying said partially or fully hydrated film directly to a polar surface or metal activated surface of a substrate, and
   laminating said partially or fully hydrated film onto the polar surface or activated metal surface of the substrate by drying to form the permanent laminate, wherein the polar surface or the metal activated surface has active metal and/or polar groups or moieties on the surface for forming any of a hydrogen bond, covalent bond, or ionic bond with the sulfonic acid or sulfonate ester functional groups of the film, and wherein the film does not delaminate from the substrate after being exposed to humidity of up to 85%, at a temperature of at least 60° C., for a duration of at least 72 hours, forming the permanent laminate.

2. The permanent laminate of claim 1, wherein the partially or fully hydrated film is applied directly to a metal activated surface of a substrate.

3. The permanent laminate of claim 1, wherein the film of the sulfonated block copolymer has a water uptake value of from 10% to 150% by weight, relative to the weight of the film; and wherein the film is used as a moisture vapor transport membrane.

4. The permanent laminate of claim 1, wherein said film does not delaminate from the substrate when soaked in water for 30 hours.

5. The permanent laminate of claim 1, wherein the substrate surface comprises an active metal.

6. The permanent laminate of claim 1, wherein the substrate surface comprises an active metal selected from the group consisting of Li, K, Ba, Ca, NA, MG, Al, Zn, Cr, Fe, Cd, Co, Ni, Sn, and Pb or an alloy thereof.

7. The permanent laminate of claim 1, wherein the block copolymer has a configuration A-D-B-D-A, wherein the A block is poly(para-tert-butylstyrene), the D block is hydrogenated polyisoprene, and prior to sulfonation, the B block is polystyrene.

8. The permanent laminate of claim 1, wherein the D block has a glass transition temperature of less than 20° C.

9. The permanent laminate of claim 1, wherein the substrate surface comprises a metal of rows 2-4 of groups 2 through 13 of the periodic table of the elements, or an alloy of 2 or more of the metals.

10. The permanent laminate of claim 9, wherein the substrate surface comprises aluminum.

11. The permanent laminate of claim 1, wherein the sulfonated block copolymer has a general configuration A-D-B-D-A, A-B-D-B-A, (A-D-B)nX, (A-B-D)nX or mixtures thereof, and wherein the D block of the sulfonated block copolymer is selected from the group consisting of (i) a polymerized or copolymerized conjugated diene selected from isoprene, and 1,3-butadiene, having a vinyl content prior to hydrogenation of between 20 and 80 mole percent, and a number average molecular weight of between 1,000 and 50,000, (ii) a polymerized acrylate monomer, (iii) a silicon polymer, (iv) a polymerized isobutylene and (v) mixtures thereof, wherein any segments containing polymerized 1,3-butadiene or isoprene are subsequently hydrogenated.

12. The permanent laminate of claim 11, wherein the A block has a molecular weight of between 3,000 and 30,000.

13. The permanent laminate of claim 11, wherein the B block has a molecular weight of between 30,000 and 100,000.

14. The permanent laminate of claim 11, wherein the B block has a molecular weight of between 1,000 and 50,000.

15. A permanent laminate formed by a process comprising:

providing a film consisting essentially of a sulfonated pentablock copolymer of formula Poly(para-tert-butylstyrene-isoprene-styrene-isoprene-para-tert-butylstyrene), wherein the poly(para-tert-butylstyrene) block contains essentially no sulfonic acid or sulfonate ester functional groups, and the polystyrene block contains from 10 to 100 mol percent sulfonic acid or sulfonate ester functional groups based on the number of monomer units;

exposing the film to water to obtain a partially or fully hydrated film, applying said partially or fully hydrated film directly to a polar surface or metal activated surface of a substrate, and laminating said partially or fully hydrated film onto the polar surface or activated metal surface of the substrate by drying to form the permanent laminate, wherein the polar surface or the metal activated surface has active metal and/or polar groups or moieties on the surface for forming any of a hydrogen bond, covalent bond, or ionic bond with the sulfonic acid or sulfonate ester functional groups of the film, and wherein the film does not delaminate from the substrate after being exposed to humidity of up to 85%, at a temperature of at least 60° C., for a duration of at least 72 hours, forming the permanent laminate.

16. The permanent laminate of claim 15, wherein the partially or fully hydrated film is laminated on to an activated metal surface of a substrate, wherein the metal activated surface has an active metal selected from the Activity Series of elements or alloys thereof.

* * * * *